United States Patent
Jaiswal et al.

(10) Patent No.: US 11,123,932 B2
(45) Date of Patent: Sep. 21, 2021

(54) SYSTEM AND METHOD FOR PROVIDING VARIATION IN BEAD SIZE TO IMPROVE GEOMETRICAL ACCURACY OF DEPOSITED LAYERS IN AN ADDITIVE MANUFACTURING PROCESS

(71) Applicant: Siemens Industry Software Inc., Plano, TX (US)

(72) Inventors: Prakhar Jaiswal, Buffalo, NY (US); Suraj Ravi Musuvathy, Princeton, NJ (US); Erhan Arisoy, Princeton, NJ (US); David Madeley, Lincolnshire (GB)

(73) Assignee: Siemens Industry Software Inc., Plano, TX (US)

( * ) Notice: Subject to any disclaimer, the term of this patent is extended or adjusted under 35 U.S.C. 154(b) by 74 days.

(21) Appl. No.: 16/475,904

(22) PCT Filed: Sep. 26, 2017

(86) PCT No.: PCT/US2017/053353
§ 371 (c)(1),
(2) Date: Jul. 3, 2019

(87) PCT Pub. No.: WO2019/066767
PCT Pub. Date: Apr. 4, 2019

(65) Prior Publication Data
US 2019/0351620 A1 Nov. 21, 2019

(51) Int. Cl.
B29C 64/393 (2017.01)
B33Y 30/00 (2015.01)
(Continued)

(52) U.S. Cl.
CPC .......... B29C 64/393 (2017.08); B29C 64/20 (2017.08); B33Y 30/00 (2014.12); B33Y 50/02 (2014.12);
(Continued)

(58) Field of Classification Search
None
See application file for complete search history.

(56) References Cited

U.S. PATENT DOCUMENTS

| 2016/0098825 A1* | 4/2016 | Dave | G06K 9/6201 |
| | | | 419/53 |
| 2016/0179064 A1* | 6/2016 | Arthur | B29C 64/393 |
| | | | 700/98 |

OTHER PUBLICATIONS

Hua et al.; "Adaptive direct metal/material deposition process using a fuzzy logic-based controller"; Journal of Laser Applications; 2005; 17.4; pp. 200-210, 12 pages.
(Continued)

Primary Examiner — Mohammad Ali
Assistant Examiner — Saad M Kabir

(57) ABSTRACT

A system may include a processor configured to receive toolpaths along which a 3D printer deposits beads of material in a plurality of layers in order to additively build up a product. Based on the toolpaths, the processor may determine an image for each layer and may process the images based on a default bead size to determine a bead size image for each layer comprised of pixels having values that specify bead size for locations along the toolpaths. The image processing produces pixel values for the bead size images that vary in magnitude at different locations along the toolpaths in order to represent smaller and larger bead sizes relative to the default bead size, which smaller and larger bead sizes respectively minimize over-depositing and under-depositing of material by the 3D printer that would otherwise occur with the default bead size.

20 Claims, 9 Drawing Sheets

(51) Int. Cl.
  *B33Y 50/02* (2015.01)
  *B29C 64/20* (2017.01)
  *G05B 19/19* (2006.01)
(52) U.S. Cl.
  CPC .... *G05B 19/19* (2013.01); *G05B 2219/49007* (2013.01)

(56) References Cited

OTHER PUBLICATIONS

Fathi et al.; "Clad height control in laser solid freeform fabrication using a feedforward PID controller"; The International Journal of Advanced Manufacturing Technology; 2007; 35.3-4; pp. 280-292, 14 pages.

Song et al.; "Control of melt pool temperature and deposition height during direct metal deposition process"; The International Journal of Advanced Manufacturing Technology; 2012; 58.1-4; pp. 247-256, 11 pages.

Bresenham; "Algorithm for computer control of a digital plotter"; IBM Systems journal 4.1; 1965; pp. 25-30, 7 pages.

Meijster et al.; "A general algorithm for computing distance transforms in linear time"; Mathematical Morphology and is applications to image and signal processing; 2002; pp. 331-340; Springer, US, 11 pages.

Donghong Ding et al: "Bead Modelling and Implementation of Adaptive MAT Path in Wire and Arc Additive Manufacturing", Robotics and Computer Integrated Manufacturing, Elsevier Science Publishers BV, Barking, GB, vol. 39, Dec. 19, 2015, 12 pages.

Huan Qi: "Adaptive Toolpath Deposition Method for Laser Net Shape Manufacturing and Repair of Turbine Compressor Airfoils", International Journal of Advanced Manufacturing Technology, Springer, Berlin, DE, vol. 48, No. 1-4, Aug. 30, 2009, 12 pages.

A.IL Adediran et al: Visual Sensing and Image Processing for Error Detection in Laser Metal Wire Deposition:, Solid Freeform Fabrication 2017: Proceedings of the 28th Annual International Solid Freeform Fabrication Symposium—An Additive Manufacturing Conference, Aug. 9, 2017 Austin, TX, USA, 12 pages.

PCT Search Report dated May 16, 2018, for PCT Application No. PCT/US2017/053353, 14 pages.

* cited by examiner

FIG. 7 — 700
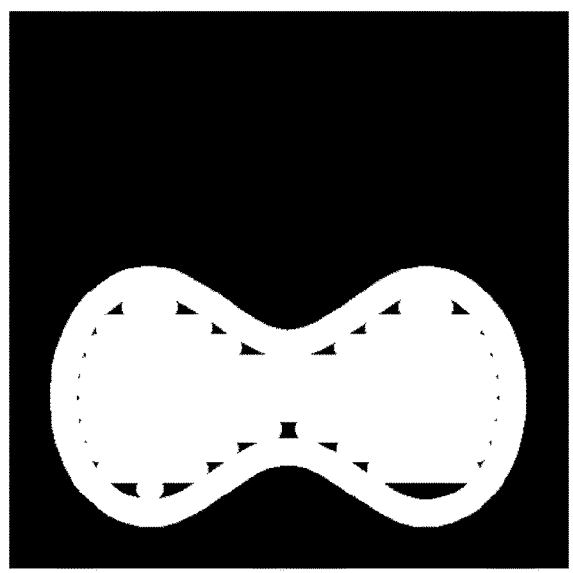
FIG. 8 — 800
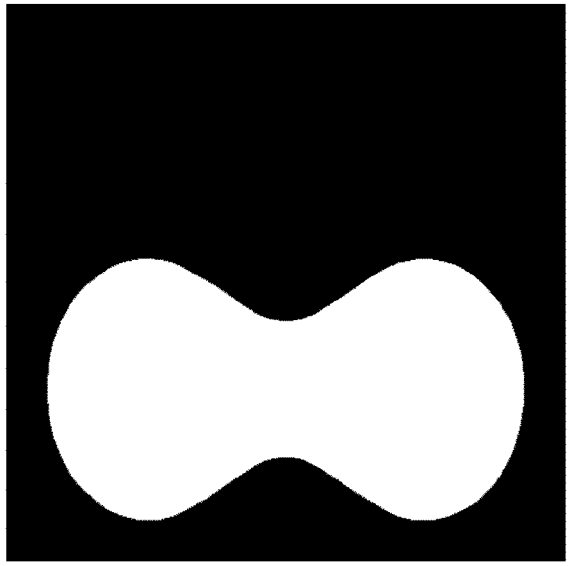
FIG. 9 — 900
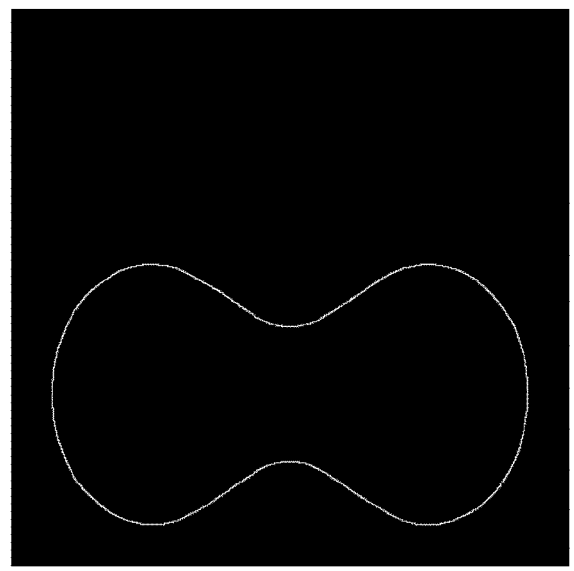

FIG. 13
Overlap Parameter = 0.75
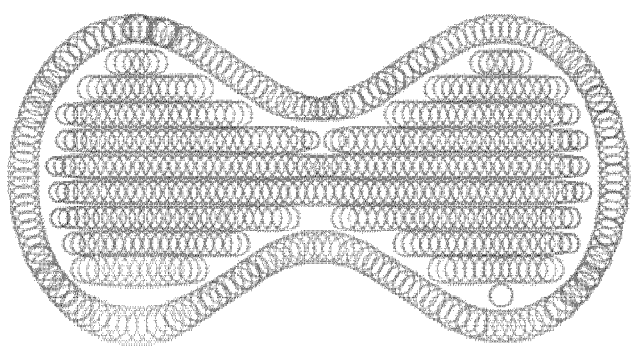
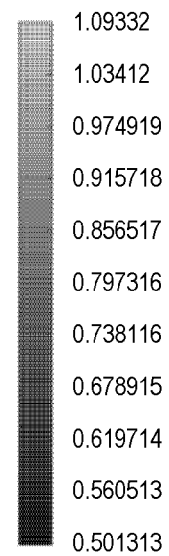
FIG. 14
Overlap Parameter = 1.25
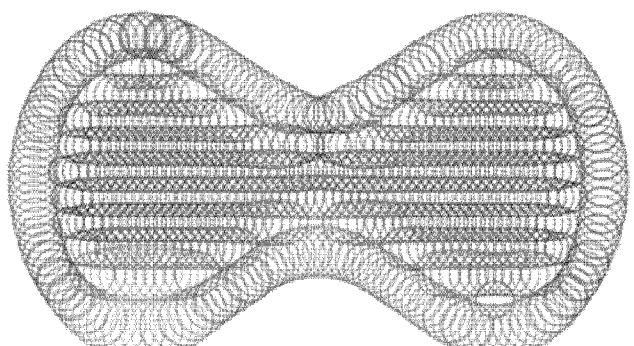
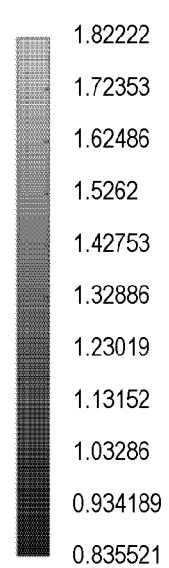

SYSTEM AND METHOD FOR PROVIDING VARIATION IN BEAD SIZE TO IMPROVE GEOMETRICAL ACCURACY OF DEPOSITED LAYERS IN AN ADDITIVE MANUFACTURING PROCESS

TECHNICAL FIELD

The present disclosure is directed, in general, to computer-aided design (CAD), computer-aided manufacturing (CAM), computer-aided engineering (CAE), visualization, simulation, and manufacturing systems, product data management (PDM) systems, product lifecycle management (PLM) systems, and similar systems, that are used to create, use, and manage data for products and other items (collectively referred to herein as product systems).

BACKGROUND

Product systems may be used to generate instructions usable by 3D-printers to additively produce products. Such systems may benefit from improvements.

SUMMARY

Variously disclosed embodiments include data processing systems and methods that may be used to facilitate providing variation in bead size to improve geometrical accuracy of deposited layers in an additive manufacturing process. In one example, a system may comprise at least one processor configured via executable instructions included in at least one memory to receive a plurality of toolpaths according to which a 3D printer is operable to deposit beads of material in a plurality of layers in order to additively build up a product. The at least one processor may also be configured to determine an image for each layer based on the toolpaths and process the images based on a default bead size to determine a bead size image for each layer comprised of pixels having values that specify bead size for locations along the toolpaths. The image processing produces pixel values for the bead size images that vary in magnitude at a plurality of different locations along the toolpaths in order to represent smaller and larger bead sizes relative to the default bead size. The smaller and larger bead sizes respectively minimize over-depositing and under-depositing of material by the 3D printer that would otherwise occur with the default bead size at these different locations along the toolpaths. The at least one processor may also generate instructions for driving the 3D printer to additively build up the product, based on the toolpaths and the pixel values along the toolpaths. The generated instructions vary process parameters in order to vary the size of the beads according to the pixel values.

In another example, a method for providing variation in bead size to improve geometrical accuracy of deposited layers in an additive manufacturing process may comprise acts carried out through operation of at least one processor that correspond to the functions for which the previously described at least one processor is configured to carry out.

A further example may include a non-transitory computer readable medium encoded with executable instructions (such as a software component on a storage device) that when executed, causes at least one processor to carry out this described method.

Another example may include a product or apparatus including at least one hardware, software, and/or firmware based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 7 illustrates an example of a dilated image generated from the binary image shown in FIG. 2.

FIG. 8 illustrates an example of a slice print region image generated from the dilated image shown in FIG. 7.

FIG. 9 illustrates an example of a boundary image generated from the slice print region image shown in FIG. 8.

FIG. 13 illustrates a schematic illustration of a layer printed using a variable bead size for the example toolpath shown in FIG. 2 based on the calculated bead size image and a 0.75 overlapping parameter.

FIG. 14 illustrates a schematic illustration of a layer printed using a variable bead size for the example toolpath shown in FIG. 2 based on the calculated bead size image and a 1.25 overlapping parameter.

DETAILED DESCRIPTION

Figure 1:
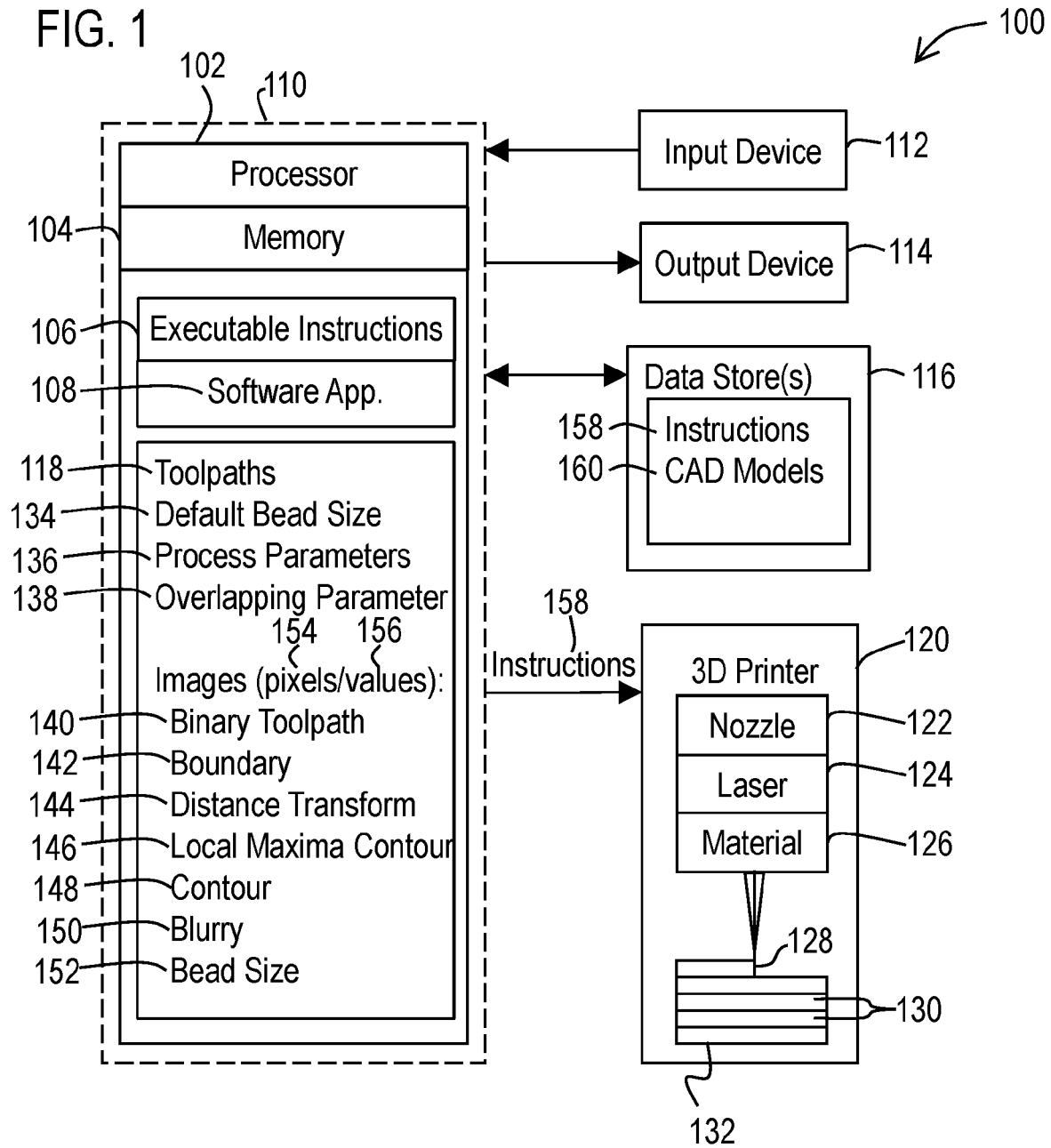
FIG. 1 illustrates a functional block diagram of an example system that facilitates providing variation in bead size to improve geometrical accuracy of deposited layers in an additive manufacturing process.

Various technologies that pertain to systems and methods that facilitate providing variation in bead size to improve geometrical accuracy of deposited layers in an additive manufacturing process will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

With reference to FIG. 1, an example data processing system 100 is illustrated that facilitates carrying out one or more of the embodiments described herein. The system 100 may comprise a combination 110 including at least one processor 102 (e.g., a microprocessor/CPU) that is configured to carry out various processes and functions described herein by executing from a memory 104, executable instructions 106 (such as software instructions) corresponding to one or more software applications 108 or portions thereof that are programmed to cause the at least one processor to carry out the various processes and functions described herein.

Such a memory 104 may correspond to an internal or external volatile memory (e.g., main memory, CPU cache, and/or RAM), that is included in the processor and/or in operative connection with the processor. Such a memory 104 may also correspond to a nonvolatile memory (e.g., flash memory, SSD, hard drive, or other storage device or non-transitory computer readable media) in operative connection with the processor.

The described data processing system 100 may include at least one input device 112 and at least one display device 114 in operative connection with the processor. The input device, for example, may include a mouse, keyboard, touch screen, or other type of input device capable of providing user inputs to the processor. The display device, for example, may include an LCD or AMOLED display screen, monitor, or any other type of display device capable of displaying outputs from the processor. For example, the processor 102, memory 104, software instructions 106, input device 112, and display device 114, may be included as part of a data processing system corresponding to a PC, workstation, server, notebook computer, tablet, mobile phone, or any other type of computing system, or any combination thereof.

The data processing system 100 may also include one or more data stores 116. The processor 102 may be configured to manage, retrieve, generate, use, revise, and store data and/or other information described herein from/in the data store 116. Examples of a data store may include a file and/or a record stored in a database (e.g., Oracle, Microsoft SQL Server), file system, hard drive, SSD, flash drive, memory card and/or any other type of device or system that stores non-volatile data.

In example embodiments, the software application 108 may include one or more PLM software applications that may be adapted to carry out one or more of the processes and functions described herein. PLM software may include computer-aided design (CAD), computer-aided manufacturing (CAM), and computer-aided engineering (CAE) software. Examples of such PLM software applications may include the NX suite of applications, Solid Edge software, and/or Teamcenter software, produced by Siemens Product Lifecycle Management Software Inc., of Plano, Tex., US. However, it should be appreciated that the processes and functions described herein may be carried out using other product systems that manage, retrieve, generate, use, revise, and/or store product data.

Such PLM software applications may be configured to generate toolpath instructions 158 (e.g., G-code or other instructions) that are usable by three-dimensional (3D) printers to produce products such as parts based on 3D models (e.g., solid models, 3D CAD models, and/or geometric models) of the parts. It should be understood that a 3D printer 122 corresponds to a machine capable of additively manufacturing (i.e., producing) 3D parts by depositing materials which bind together to form the physical structure of the part. Examples of additive manufacturing processes employed by 3D printers to build 3D parts using a high power laser 124 or electron beam to selectively sinter or melt a powdered material (typically metallic) include: selective laser sintering (SLS), selective laser melting (SLM), and directed energy deposition (DED). Other types of 3D printers may apply other techniques for selectively depositing material to additively build up a part. Also, it should be understand that the phrase to "build up" does not require the material to be built up only in a vertical upward direction, but may include building up the part in a horizontal direction as well as building up the part in a vertical downward direction, depending on the technology of the 3D printer that is used.

The examples described herein may be applied to 3D printers that use lasers to melt deposited material. In particular, the examples described below may be used with laser powder deposition (LPD) 3D printers which are a type of DED that uses a laser beam to melt powdered material blown out of a nozzle while moving along toolpaths. However, the example provided herein may also be adapted for use with other types of 3D printers and additive manufacturing techniques.

It should be understood that variations in the layer shape in a laser based 3D printer may make it difficult to control the dimensions and tolerances of the printed part. For example, it may be difficult and (often impossible) to fill a layer completely and exclusively with a uniform bead size without over- or under-deposition at a few locations.

In one approach to overcome this problem, feedback control using sensors during the 3D-printing process may be used to monitor and regulate the height of the deposition layer. However, many deposition issues may not be correctable after deposition has already started. The following examples provide an alternative or additional approach which proactively varies bead size (e.g., bead width, radius, diameter) at locations along the tools paths in order to improve geometrical accuracy of deposited layers, by controllably varying one or more process-specific parameters of the 3D printer.

For example, an example embodiment may pre-determine variations in bead size at each location along toolpaths received for use with producing a product using a 3D printer. The knowledge of default bead size may be used in example embodiments to generate instructions (e.g., G code) for driving the 3D printer in which process parameters, such as laser power and nozzle speed, are tuned (without needing to adjust the location of toolpaths) in order to vary the bead size along the toolpaths. When such instructions are used to drive the 3D printer, such variation in bead size may overcome issues of over- and under-deposition and enable the resulting dimensions of the layers of the resulting physical product to more accurately correspond to the original geometric model of the product from which the toolpaths were generated.

In this example, image processing techniques may be used to determine data usable to vary bead sizes along toolpaths of layers. The following describes an example of this approach. However, it should be appreciated that the examples illustrated are for a particular example of this approach. Alternative embodiments may employ alternative features based on the particular process parameters applicable to the 3D printer and its associated additive manufacturing processes that are desired to be used.

For example, an input to the system 100 may include at least one toolpath Z which corresponds to data defining the location of a toolpath to be followed by a nozzle of a 3D printer when depositing material to build up a layer for a product. Such a toolpath Z may have been previously generated using CAM software processing a CAD model of the desired product that is intended to be produced via the 3D printer using a constant laser width w.

Figure 2:
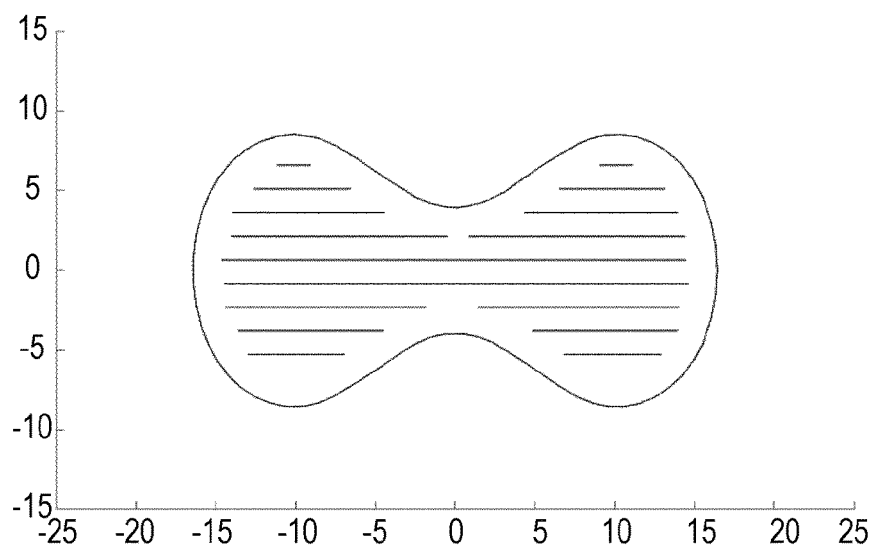
FIG. 2 illustrates an example graph of a toolpath for which a 3D printer may be configured to follow in order to deposit beads of material to build up a product.

A deposited bead size generally corresponds to the laser width. Thus, a default bead radius may be assumed to be equal to half of the laser width (w/2). FIG. 2 schematically illustrates an example graph showing an example toolpath Z 200 of a layer to be printed using a constant default bead size with a circular shape. In this example, the layer thickness was assumed to be constant. Also in this example, the bead size was dictated by its radius r in the plane parallel to the layer. Hence, this described example is directed to the two-dimensional layer formed by circular beads being deposited along the toolpath.

Figure 3:
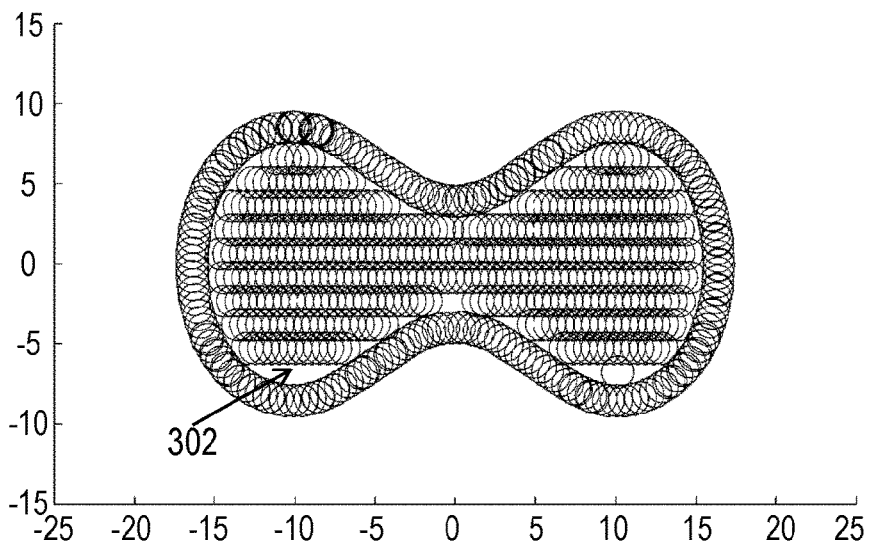
FIG. 3 illustrates a schematic illustration of a graph of a layer printed using a constant default bead size for the example toolpath shown in FIG. 2.

FIG. 3 schematically illustrates an example graph of a layer 300 printed using a constant default bead size (corresponding to the default laser width) for the toolpath Z illustrated in FIG. 2. Each circle represents discrete bead sizes at locations along the toolpaths. It should be noted that in region 302 of the layer, under-deposition is likely to occur due to use of the depicted default bead size.

Example embodiments may be configured to generate 2-dimensional (2D) images from the toolpath Z. Such images may be processed to produce data usable to proactively vary the bead radius in order to mitigate the effect of over- and under-deposition of the material in localized regions of a layer. Thus, the bead radius is increased in regions in which the default bead size produces under-deposition and the bead radius is decreased in regions in which the default bead size produces over-deposition.

FIGS. 4-11 illustrate examples of the images produced using this described approach. These images were generated (at least in part) using the C++ CImg library. However, it should be appreciated that alternative embodiments may use any software library capable of carrying out corresponding image processing techniques.

A first step in this example image processing may be to convert the deposition toolpath Z (shown in FIG. 2) into a binary image $\Phi$. The toolpath Z may comprise line segments $\mathcal{L}_i$ of deposition paths of the nozzle head defined by the start and end coordinates ($\vec{p}_{i1}$ and $\vec{p}_{i2}$) of the segments in the local coordinate frame of the layer. An axis aligned bounding box of the toolpath was determined by finding the minimum and maximum X and Y coordinates of the ends of the toolpath segments in the local coordinate frame for i between 1 and N, where N is the total number of line segments in Z. Appropriate transformation parameters were computed to fit the bounding box in the binary image along with a padding of 2w width all around to ensure sufficient space for segments near the boundary. The padding mimics the space where the material could flow in the practical scenario while depositing near the boundary. The transformation parameters were used to convert from the local layer coordinate frame to the image pixel coordinates and vice-versa.

Figure 4:
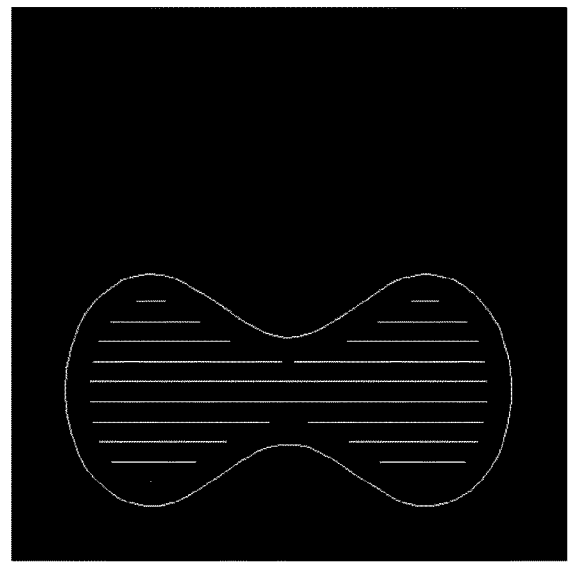
FIG. 4 illustrates an example binary image generated for the example toolpath shown in FIG. 2.

The toolpath on the binary image $\Phi$ may be generated by creating a single pixel width lines between the start and end points ($\vec{p}_{i1}$ and $\vec{p}_{i2}$) in image pixel coordinates for each toolpath line segments $\mathcal{L}_i$. For example, a line drawing algorithm may be employed for this purpose. The binary image may have a black background with white foreground pixels representing the toolpath. The image $\Phi$ may be then used for subsequent processing to estimate the bead size along the toolpath. FIG. 4 shows an example binary image $\Phi$ 400 generated for the example toolpath Z shown in FIG. 2.

Figure 5:
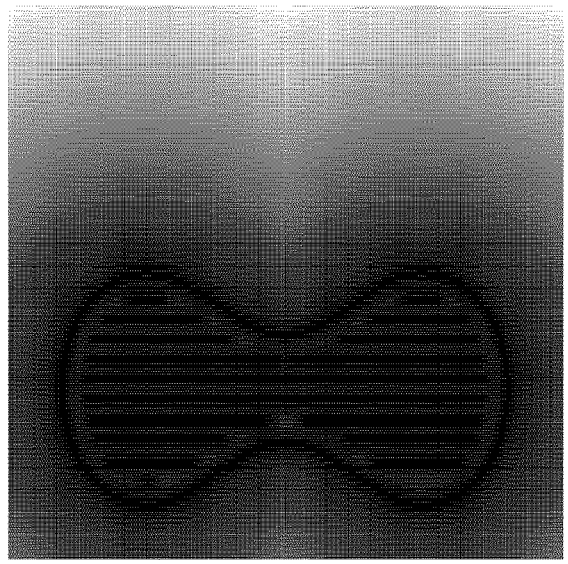
FIG. 5 illustrates an example of a distance transform image generated from the binary image shown in FIG. 4.
Figure 6:
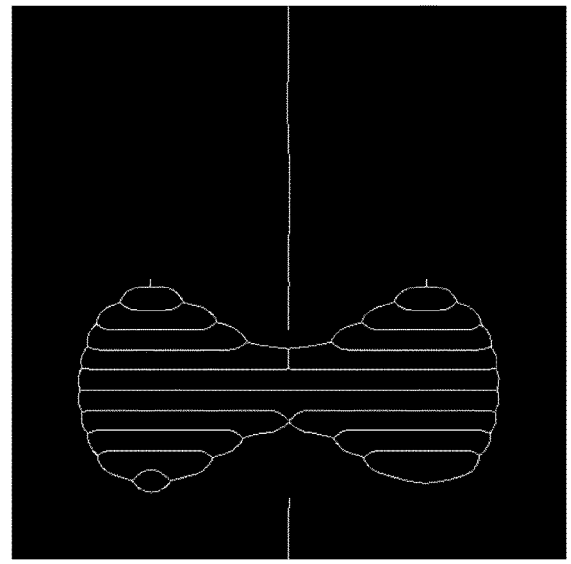
FIG. 6 illustrates an example of a maxima contour image generated from the distance transform image shown in FIG. 5.
Figure 10:
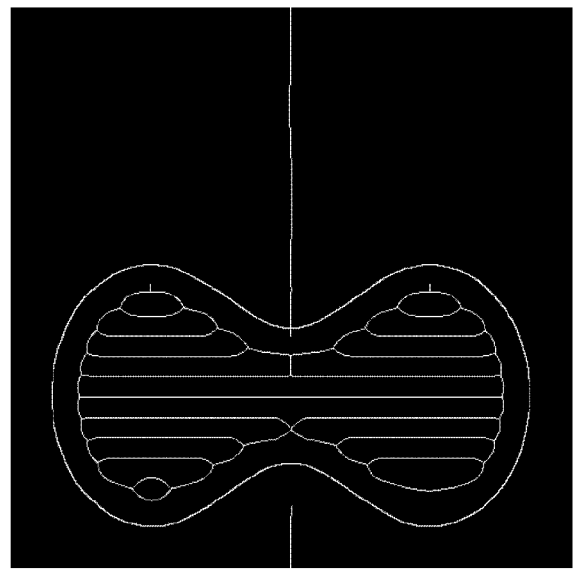
FIG. 10 illustrates an example of a contour image generated from both the boundary image shown in FIG. 9 and the maxima contour image shown in FIG. 6.

The image processing may also include computing a distance transform ($D_\Phi$) of the binary toolpath image $\Phi$. Such a distance transform may encode the information at each pixel about the nearest white pixel, i.e., its distance from the nearest nozzle head location. Also, the contour of the local maxima of the distance transform may be found. From this data, a local maxima contour $\xi(D_\Phi)$ may be computed, which depicts the boundaries till where the extruded material from the nozzle is expected to flow and fill the region. The local maxima contour may be identified by linear searches in X and Y direction independently (one row/column at a time) and taking the Boolean unions of the identified maximas. In any linear list of pixels, a pixel at position i is a local maxima if any of the following two conditions are met:

$$(d(i) > d(i-1)) \wedge (d(i) > d(i+1))$$

$$(d(i) \geq d(i-1)) \wedge (d(i) \geq d(i+1)) \wedge (d(i) > d(i-2)) \wedge (d(i) > d(i+2))$$

where, d(·) is the value of distance transform at the pixel location specified by its argument and $\wedge$ is the logical AND operation. The pixels may be compared only up to second neighbor because it may not be possible for distance transform of a binary image to have larger flat regions. For the binary image $\Phi$ shown in FIG. 4, an example of such a computed distance transform $D_\Phi$ image 500 is shown in FIG. 5 and its maxima contour $\xi(D_\Phi)$ image 600 of the distance transform is shown in FIG. 6.

The local maxima contour $\xi(D_\Phi)$ of the distance transform $D_\Phi$ bounds all of the toolpath segments on both sides, except for the segments near the boundaries of the slice print regions that are bounded only on one side (from the interior side of the print region). To add the missing bounds, the boundaries of a slice print region $\Omega$ may be extracted from the binary toolpath image $\Phi$ and merged with the local maxima contour $\xi(D_\Phi)$.

In this described approach, the boundaries of the slice print region $\Omega$ may be approximated using dilation and closing operations. For example, the binary image Φ of the toolpath may first be dilated with a circular structuring element Γ of diameter w representing the laser beam.

As shown in FIG. 7, the resultant dilated image 700 may include a few holes in areas with sparse toolpath segments (under-deposition regions). The holes may be filled using a morphological closing operation, such as dilation followed by erosion using the same w diameter circular structuring element Γ. The boundary β(Ω) of the resultant image Ω may be determined by taking Boolean difference between Ω and its erosion by a small 3×3 structuring elements γ, such that:

$$\Omega \cong \varepsilon_\Gamma(\delta_\Gamma(\delta_\Gamma(\Phi)))$$

$$\beta(\Omega) = \Omega \backslash \varepsilon_\gamma(\Omega)$$

where $\varepsilon_b(A)$ and $\delta_b(A)$ represent the erosion and dilation of A by structuring element b, respectively. By using these equations, slice print region Ω 800 may be produced as shown in FIG. 8 and the computed boundary β(Ω) 900 of the slice print region Ω is shown in FIG. 9. The local maxima contour of the distance transform $\xi(D_\Phi)$ and the boundary of slice print region β(Ω) may then be unified together with a Boolean union operation to form the contour image Ψ 1000 shown in FIG. 10.

Figure 11:
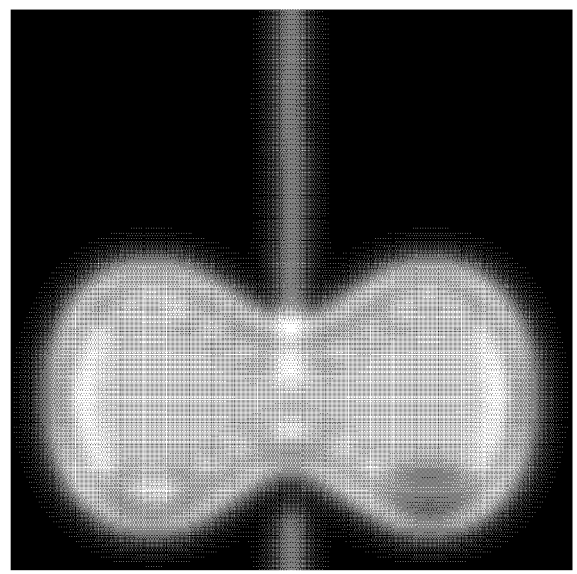
FIG. 11 illustrates an example of a blurred grayscale image generated from the contour image shown in FIG. 10.

The described image processing may also include blurring of the image Ψ using a Gaussian kernel with standard deviation of w/2 in pixel coordinates. An example of such a blurred image 1100 is shown in FIG. 11. The blurring fills the pixels that are closer to more white pixels with higher values and vice-versa. The pixel values of blurred image provide approximate averaged measure of how close the pixels are from surrounding contours. In this example, the blurred image was inverted by subtracting all pixel values from 255 (white pixel high value). The inverted blurred image was also normalized in the range [0.25, 1].

A higher value at the toolpath location in the normalized image indicates that more material needs to be deposited at this location as it is farther away from surrounding contours on average. Hence, it provides an indicator for bead size. The values for the pixels corresponding to the toolpath (Φ>0) were retained and remaining pixels were set to zero. The non-zero values were then rescaled to ensure that the double of their sum is equal to the area of the slice print region Ω. The rescaling strategy assumes that the number of unique pixels filled with material by a toolpath pixel is equal to the diameter of the bead in pixel coordinates at that location. Hence in this example, the rescaled values represent the bead radii (in pixel coordinates) required at the corresponding locations. Such an image that represents bead sizes along the tool paths via pixel values is referred to as a bead size image.

A bead size image may resemble the binary image shown in FIG. 4, however, with the white lines representing tool paths updated to include various shades of gray representing pixel values corresponding to the bead size. In this example, pixel values corresponding to bead size (such as bead radii) along the toolpaths may correspond to values that are equal to, or are proportional, or have some other known relationship to radii values in a particular unit of length.

Figure 12:
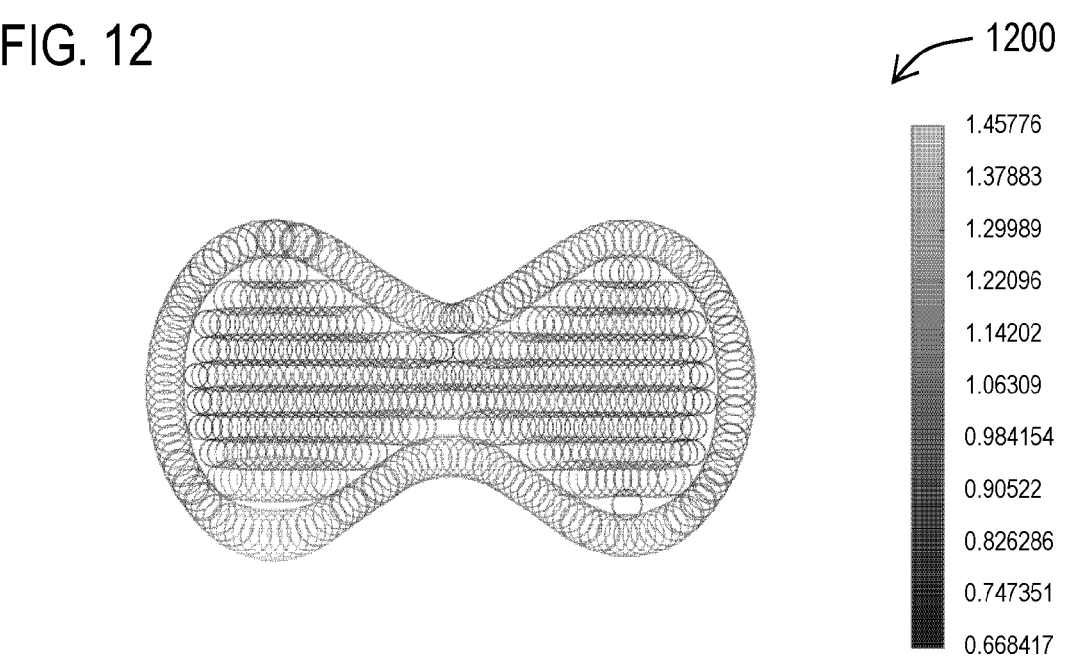
FIG. 12 illustrates a schematic illustration of a layer printed using a variable bead size for the example toolpath shown in FIG. 2 based on the calculated bead size image.

Thus, the recommended bead size at any location on the toolpath can be computed using the scaled pixel values. For any point on the toolpath, the nearest nonzero pixel determines the recommended bead size at that point. FIG. 12 shows an example schematic illustration 1200 of a layer to be printed with the computed variable bead size along the toolpaths showing circles plotted corresponding to the bead size along the toolpaths.

Also, by using a multiplier factor as an overlapping parameter 138, overlap amount of deposited material can be controlled. The default value of an overlapping parameter may be 1 as shown in FIG. 12. Two examples of bead sizes with different overlapping parameters (0.75 and 1.25) for use as a multiplier factor for the bead sizes are shown in the respective images 1300, 1400 of FIGS. 13 and 14. An example embodiment may enable such an overlapping parameter to be a user configurable parameter (e.g., via a configuration in a graphical user interface).

This described process may be implemented by the data processing system illustrated in FIG. 1. In this example, the processor may be configured to receive a plurality of toolpaths 118 along which a 3D printer 120 may be driven to deposit beads 128 of material 126 in a plurality of layers 130 in order to additively build up a product 132. Such toolpaths may be received by the processor generating the toolpaths from a solid model 160 (e.g., a CAD model of the product) executing CAM software. However, such toolpaths may also be retrieved from a data store 116 and/or another data processing system.

Based on the toolpaths, the processor may be configured to determine an image 140 for each layer, such as the previously described binary toolpath image (See FIG. 4). In addition the processor may be configured to carry out image processing of the images based on a default bead size 134 to determine a bead size image 152 for each layer comprised of pixels 154 having values 156 that specify bead size for locations along the toolpaths. In this example, the default bead size 134 may correspond to and/or be based on a constant laser beam width for the laser 124 of the 3D printer 120. Such a default bead size 134 may be stored in the memory 104 and/or may be accessed from a data store 116 for use with the calculations described herein. Such a default bead size may also be a user configurable parameter that is modified via a GUI of the software application 108.

In an example embodiment, the image processing produces pixel values for the bead size images that vary in magnitude at a plurality of different locations along the toolpaths in order to represent smaller and larger bead sizes relative to the default bead size. Such smaller and larger bead sizes respectively minimize over-depositing and under-depositing of material by the 3D printer that would otherwise occur with the default bead size at these different locations along the toolpaths.

In addition, the processor may be configured to generate instructions 158 (e.g., G code) for driving the 3D printer to additively build up the product, based on the toolpaths and the pixel values along the toolpaths. Such generated instructions may vary process parameters 136 in order to vary the size of the beads according to the pixel values, without changing the relative locations of the toolpaths upon which the bead size images were based. Variation of the processor parameters may affect the manner in which a nozzle 122 of the 3D printer 120 outputs material 126 and/or the manner in which the laser melts the material. For example, such processor parameters that are controlled via the instructions may include nozzle speed and laser power.

As discussed previously, the processor may be configured to generate for each layer a binary toolpath image 140 based on the toolpaths, such that pixels of each binary toolpath image have one value (e.g., 1—white) that specifies a toolpath location and a second value (e.g., 0—black) that specifies the absence of a toolpath location. The image processing may then be carried out using the binary toolpath images and data corresponding to the default bead size. For example, the image processing may include processing each binary toolpath image into a blurry grayscale image 150 that depicts locations at which bead size should be increased to fill holes not filled by toolpaths with the default bead size (e.g., see FIG. 11). The bead size images are generated based on these grayscale images.

Also as discussed previously, the image processing may include several steps including processing each binary toolpath image 140 to produce a boundary image 142 depicting an outer boundary of each layer (e.g., see FIG. 9). These steps may also include: processing each binary toolpath image 140 to produce a distance transform image 144 having pixels with values that represent distance to the nearest nozzle head location (See FIG. 5); and processing each distance transform image 144 to produce a local maxima contour image 146 that depicts boundaries where extruded material from the nozzle is expected to flow and fill a region of a layer (e.g., see FIG. 6).

As discussed previously the image processing steps may include unifying the boundary images 142 and the local maxima contour images 146 to form a contour 148 image (e.g., see FIG. 10); and blurring the contour image to form the grayscale image 150 (e.g., see FIG. 11). Also, as discussed previously, the blurring of the contour image 146 may be based on a Gaussian kernel with standard deviation corresponding to half the default bead size in pixel coordinates. The resulting grayscale image may then be inverted, normalized, have pixel values for pixels that do not correspond to the toolpaths set to zero, and rescaled to produce the bead size images in which non-zero values of the pixel values are set to correspond to bead size radii in pixel coordinates at the locations of the toolpaths. When the instructions for driving the 3D printer are generated, the process parameters may be selected to control bead size along to toolpaths based at least in part on the pixel values of the bead size images, such that for a given point along the toolpaths, the nearest nonzero pixel is used to control bead size at that point.

Figure 15:
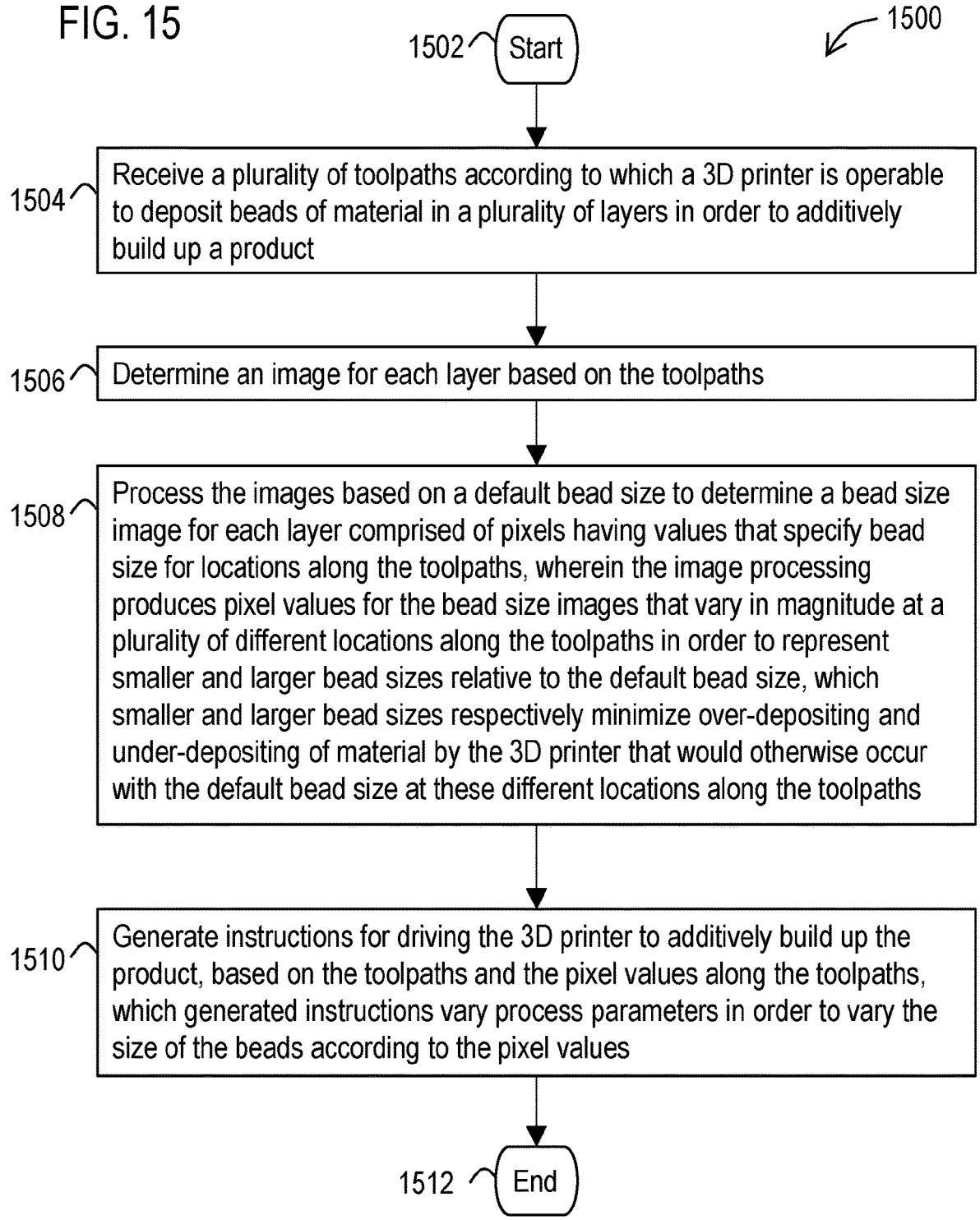
FIG. 15 illustrates a flow diagram of an example methodology that facilitates providing variation in bead size to improve geometrical accuracy of deposited layers in an additive manufacturing process.

Referring now to FIG. 15, a methodology 1500 is illustrated that facilitates providing variation in bead size to improve geometrical accuracy of deposited layers in an additive manufacturing process. While the methodology is described as being a series of acts that are performed in a sequence, it is to be understood that the methodology may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The methodology may start at 1502 and may include several acts carried out through operation of at least one processor. These acts may include an act 1504 of receiving a plurality of toolpaths according to which a 3D printer is operable to deposit beads of material in a plurality of layers in order to additively build up a product. The methodology may also include an act 1506 of determining an image for each layer based on the toolpaths and an act 1508 of processing the images based on a default bead size to determine a bead size image for each layer comprised of pixels having values that specify bead size for locations along the toolpaths. The image processing may produce pixel values for the bead size images that vary in magnitude at a plurality of different locations along the toolpaths in order to represent smaller and larger bead sizes relative to the default bead size, which smaller and larger bead sizes respectively minimize over-depositing and under-depositing of material by the 3D printer that would otherwise occur with the default bead size at these different locations along the toolpaths. In addition, the methodology may include an act 1510 of generating instructions for driving the 3D printer to additively build up the product, based on the toolpaths and the pixel values along the toolpaths, which generated instructions vary process parameters in order to vary the size of the beads according to the pixel values. At 1512 the methodology may end.

Also, it should be appreciated that this described methodology may include additional acts and/or alternative acts corresponding to the features described previously with respect to the data processing system 100. The described acts may be carried out by one or more processors 102.

Also, as used herein a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. It should be understood that a processor that is described or claimed as being configured to carry out a particular described/claimed process or function may: correspond to a CPU that executes computer/processor executable instructions stored in a memory in the form of software and/or firmware to carry out such a described/claimed process or function; and/or may correspond to an IC that is hard wired with processing circuitry (e.g., an FPGA or ASIC IC) to carry out such a described/claimed process or function.

It should also be understood that a processor that is described or claimed as being configured to carry out a particular described/claimed process or function may correspond to the combination 110 of the processor 102 with the software instructions 106 loaded/installed into the described memory 104 (volatile and/or non-volatile), which are currently being executed and/or are available to be executed by the processor to cause the processor to carry out the described/claimed process or function. Thus, a processor that is powered off or is executing other software, but has the described software instructions installed on a storage device in operative connection therewith (such as a hard drive or SSD) in a manner that is setup to be executed by the processor (when started by a user, hardware and/or other software), may also correspond to the described/claimed processor that is configured to carry out the particular processes and functions described/claimed herein.

Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes.

It is important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., the described software instructions and/or corresponding firmware instructions) contained within a non-transitory machine-usable, computer-usable, or computer-readable medium in any of a variety of forms, and that the present disclosure applies equally regardless of the particular type of instruction or data bearing medium or storage medium utilized to actually carry out the distribution. Examples of non-transitory machine usable/readable or computer usable/ readable mediums include: ROMs, EPROMs, magnetic tape, hard disk drives, SSDs, flash memory, CDs, DVDs, and Blu-ray disks. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, C, C #, C++ or any other form of code that can be programmed/configured to cause at least one processor to carry out the acts and features described herein. Still further, results of the described/claimed processes or functions may be stored in a computer-readable medium, displayed on a display device, and/or the like.

Figure 16:
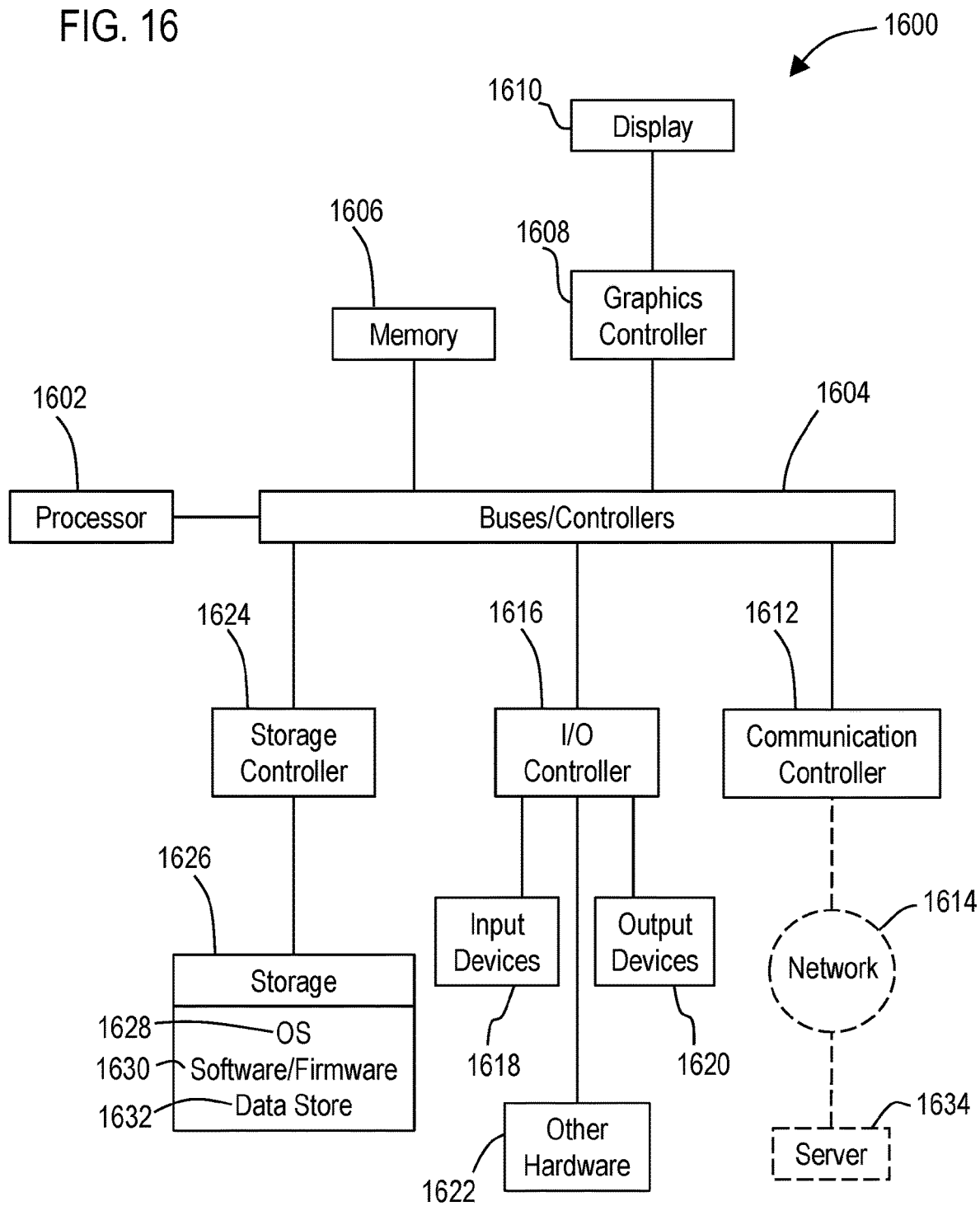
FIG. 16 illustrates a block diagram of a data processing system in which an embodiment may be implemented.

FIG. 16 illustrates a block diagram of a data processing system 1600 (e.g., a computer system) in which an embodiment can be implemented, such as the previously described system 100, and/or other system operatively configured by computer/processor executable instructions, circuits, or otherwise to perform the functions and processes as described herein. The data processing system depicted includes at least one processor 1602 (e.g., a CPU) that may be connected to one or more bridges/controllers/buses 1604 (e.g., a north bridge, a south bridge). One of the buses 1604, for example, may include one or more I/O buses such as a PCI Express bus. Also connected to various buses in the depicted example may include a main memory 1606 (RAM) and a graphics controller 1608. The graphics controller 1608 may be connected to one or more display devices 1610 (e.g., LCD or AMOLED display screen, monitor, VR headset, and/or projector). It should also be noted that the processor 1602 may include a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1612 (Ethernet controllers, WiFi controllers, cellular controllers) operative to connect to a local area network (LAN), Wide Area Network (WAN), a cellular network, and/or other wired or wireless networks 1614 or communication equipment.

Further components connected to various busses may include one or more I/O controllers 1616 such as USB controllers, BLUETOOTH® controllers, and/or dedicated audio controllers (connected to speakers and/or microphones). It should also be appreciated that various peripherals may be connected to the I/O controller(s) (via various ports and connections) including input devices 1618 (e.g., keyboard, mouse, pointer, touch screen, touch pad, drawing tablet, trackball, buttons, keypad, game controller, gamepad, camera, microphone, scanners, motion sensing devices that capture motion gestures), output devices 1620 (e.g., printers, speakers) or any other type of device that is operative to provide inputs to or receive outputs from the data processing system.

Also, it should be appreciated that many devices referred to as input devices or output devices may both provide inputs and receive outputs of communications with the data processing system. For example, the processor 1602 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 1622 connected to the I/O controllers 1616 may include any type of device, machine, or component that is configured to communicate with a data processing system.

Additional components connected to various busses may include one or more storage controllers 1624 (e.g., SATA). A storage controller may be connected to a storage device 1626 such as one or more storage drives and/or any associated removable media, which can be any suitable non-transitory machine usable or machine readable storage medium. Examples, include nonvolatile devices, volatile devices, read only devices, writable devices, ROMs, EPROMs, magnetic tape storage, hard disk drives, solid-state drives (SSDs), flash memory, optical disk drives (CDs, DVDs, Blu-ray), and other known optical, electrical, or magnetic storage devices drives and/or computer media. Also in some examples, a storage device such as an SSD may be connected directly to an I/O bus 1604 such as a PCI Express bus.

A data processing system in accordance with an embodiment of the present disclosure may include an operating system 1628, software/firmware 1630, and data stores 1632 (that may be stored on a storage device 1626 and/or the memory 1606). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, which is retrievable by a processor.

The communication controllers 1612 may be connected to the network 1614 (which may or may not be a part of a data processing system 1600), which can be any local, wide area, remote, private, and/or public data processing system network or combination of networks, as known to those of skill in the art, including the Internet. Data processing system 1600 can communicate over the network 1614 with one or more other data processing systems such as a server 1634 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

It should also be understood that the term "controller" means any device, system or part thereof that controls at least one operation, whether such a device is implemented in hardware, firmware, software or any combination thereof. It should be noted that the functionality associated with any particular controller may be centralized or distributed, whether locally or remotely. The described processor and memory may be included in a controller. Further, a controller may correspond to the described data processing system or any other hardware circuit that is operative to control at least one operation.

In addition, it should be appreciated that data processing systems may include virtual machines in a virtual machine architecture or cloud environment. For example, the processor 1602 and associated components may correspond to the combination of one or more virtual machine processors of a virtual machine operating in one or more physical processors of a physical data processing system. Examples of virtual machine architectures include VMware ESCi, Microsoft Hyper-V, Xen, and KVM.

Also, it should be noted that the processor described herein may correspond to a remote processor located in a data processing system such as a server that is remote from the display and input devices described herein. In such an example, the described display device and input device may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client data processing system may execute a web browser or thin client application. Inputs from the user may be transmitted from the web browser or thin client application to be evaluated on the server, rendered by the server, and an image (or series of images) sent back to the client data processing system to be displayed by the web browser or thin client application. Also in some examples, the remote processor described herein may correspond to a combination of a virtual processor of a virtual machine executing in a physical processor of the server.

Those of ordinary skill in the art will appreciate that the hardware depicted for the data processing system may vary for particular implementations. For example, the data processing system 1600 in this example may correspond to a controller, computer, workstation, server, PC, notebook computer, tablet, mobile phone, and/or any other type of apparatus/system that is operative to process data and carry out functionality and features described herein associated with the operation of a data processing system, computer, processor, software components, and/or a controller discussed herein. The depicted example is provided for the purpose of explanation only and is not meant to imply architectural limitations with respect to the present disclosure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 1600 may conform to any of the various current implementations and practices known in the art.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for providing variation in bead size to improve geometrical accuracy of deposited layers in an additive manufacturing process comprising:
   at least one processor configured via executable instructions included in at least one memory to:
      receive a plurality of toolpaths according to which a 3D printer is operable to deposit beads of material in a plurality of layers in order to additively build up a product;

determine an image for each layer based on the toolpaths;

process the images based on a default bead size to determine a bead size image for each layer comprised of pixels having values that specify bead size for locations along the toolpaths, wherein the image processing produces pixel values for the bead size images that vary in magnitude at a plurality of different locations along the toolpaths, wherein the pixel values produced by the image processing represent bead sizes along the toolpaths, wherein smaller bead sizes relative to the default bead size reduce over-depositing and larger bead sizes relative to the default bead size reduce under-depositing of material by the 3D printer that would otherwise occur with the default bead size at these different locations along the toolpaths; and generate instructions for driving the 3D printer to additively build up the product, based on the toolpaths and the pixel values along the toolpaths, which generated instructions vary process parameters in order to vary the size of the beads according to the pixel values.

2. The system according to claim 1, wherein the image for each layer includes a binary toolpath image, wherein pixels of each binary toolpath image have one value that specifies a toolpath location and a second value that specifies the absence of a toolpath location, wherein the image processing is carried out using the binary toolpath images and data corresponding to the default bead size.

3. The system according to claim 2, wherein the image processing includes processing each binary toolpath image into a grayscale image that depicts locations at which bead size should be increased to fill holes not filled by toolpaths with the default bead size, wherein the bead size images are generated based on the grayscale images.

4. The system according to claim 3, wherein the image processing includes:

processing each binary toolpath image to produce a boundary image depicting an outer boundary of each layer;

processing each binary toolpath image to produce a distance transform image having pixels with values that represent distance to the nearest nozzle head location;

processing each distance transform image to produce a local maxima contour image that depicts boundaries where extruded material from the nozzle is expected to flow and fill a region of a layer;

unifying the boundary images and the local maxima contour images to form a contour image; and blurring the contour image to form the grayscale image.

5. The system according to claim 4, wherein blurring the contour image is based on a Gaussian kernel with standard deviation corresponding to half the default bead size in pixel coordinates, wherein the image processing further includes:

inverting and normalizing the grayscale image;

setting pixel values for pixels that do not correspond to the toolpaths to zero; and producing the bead size images by rescaling non-zero values of the pixel values to correspond to bead size radii in pixel coordinates at the locations of the toolpaths.

6. The system according to claim 1, wherein the process parameters are selected to control bead size along the toolpaths based on the pixel values of the bead size images, such that for a given point along the toolpaths, the nearest nonzero pixel is used to control bead size at that point, wherein the process parameters include laser power, nozzle speed, or any combination thereof.

7. The system according to claim 1, wherein the generated instructions include G-code, further comprising the 3D printer with a nozzle that outputs material and a laser that melts the material, where the default bead size corresponds to a width of a laser beam produced by the laser, wherein the at least one processor is configured to generate the toolpath instructions from a solid model retrieved from a data store.

8. A method for providing variation in bead size to improve geometrical accuracy of deposited layers in an additive manufacturing process comprising:

through operation of at least one processor:

receiving a plurality of toolpaths according to which a 3D printer is operable to deposit beads of material in a plurality of layers in order to additively build up a product;

determining an image for each layer based on the toolpaths;

processing the images based on a default bead size to determine a bead size image for each layer comprised of pixels having values that specify bead size for locations along the toolpaths, wherein the image processing produces pixel values for the bead size images that vary in magnitude at a plurality of different locations along the toolpaths, wherein the pixel values produced by the image processing represent bead sizes along the toolpaths, wherein smaller bead sizes relative to the default bead size reduce over-depositing and larger bead sizes relative to the default bead size reduce under-depositing of material by the 3D printer that would otherwise occur with the default bead size at these different locations along the toolpaths; and generating instructions for driving the 3D printer to additively build up the product, based on the toolpaths and the pixel values along the toolpaths, which generated instructions vary process parameters in order to vary the size of the beads according to the pixel values.

9. The method according to claim 8, wherein the image for each layer includes a binary toolpath image, wherein pixels of each binary toolpath image have one value that specifies a toolpath location and a second value that specifies the absence of a toolpath location, wherein the image processing is carried out using the binary toolpath images and data corresponding to the default bead size.

10. The method according to claim 9, wherein the image processing includes processing each binary toolpath image into a grayscale image that depicts locations at which bead size should be increased to fill holes not filled by toolpaths with the default bead size, wherein the bead size images are generated based on the grayscale images.

11. The method according to claim 10, wherein the image processing includes:

processing each binary toolpath image to produce a boundary image depicting an outer boundary of each layer;

processing each binary toolpath image to produce a distance transform image having pixels with values that represent distance to the nearest nozzle head location;

processing each distance transform image to produce a local maxima contour image that depicts boundaries where extruded material from the nozzle is expected to flow and fill a region of a layer;

unifying the boundary images and the local maxima contour images to form a contour image; and blurring the contour image to form the grayscale image.

12. The method according to claim 11, wherein blurring the contour image is based on a Gaussian kernel with standard deviation corresponding to half the default bead size in pixel coordinates, wherein the image processing further includes:

inverting and normalizing the grayscale image;

setting pixel values for pixels that do not correspond to the toolpaths to zero; and producing the bead size images by rescaling non-zero values of the pixel values to correspond to bead size radii in pixel coordinates at the locations of the toolpaths.

13. The method according to claim 8, wherein the process parameters are selected to control bead size along the toolpaths based on the pixel values of the bead size images, such that for a given point along the toolpaths, the nearest nonzero pixel is used to control bead size at that point, wherein the process parameters include laser power, nozzle speed, or any combination thereof.

14. The method according to claim 8, wherein the generated instructions include G-code, further comprising the 3D printer with a nozzle that outputs material and a laser that melts the material, where the default bead size corresponds to a width of a laser beam produced by the laser, wherein the at least one processor is configured to generate the toolpaths from a solid model retrieved from a data store, further comprising:

building the product with the 3D printer configured based on the generated instructions.

15. A non-transitory computer readable medium encoded with processor executable instructions that when executed by at least one processor, cause the at least one processor to:

receive a plurality of toolpaths according to which a 3D printer is operable to deposit beads of material in a plurality of layers in order to additively build up a product;

determine an image for each layer based on the toolpaths;

process the images based on a default bead size to determine a bead size image for each layer comprised of pixels having values that specify bead size for locations along the toolpaths, wherein the image processing produces pixel values for the bead size images that vary in magnitude at a plurality of different locations along the toolpaths, wherein the pixel values produced by the image processing represent bead sizes along the toolpaths, wherein smaller bead sizes relative to the default bead size reduce over-depositing and larger bead sizes relative to the default bead size reduce under-depositing of material by the 3D printer that would otherwise occur with the default bead size at these different locations along the toolpaths; and generate instructions for driving the 3D printer to additively build up the product, based on the toolpaths and the pixel values along the toolpaths, which generated instructions vary process parameters in order to vary the size of the beads according to the pixel values.

16. The non-transitory computer readable medium according to claim 15, wherein the image for each layer includes a binary toolpath image, wherein pixels of each binary toolpath image have one value that specifies a toolpath location and a second value that specifies the absence of a toolpath location, wherein the image processing is carried out using the binary toolpath images and data corresponding to the default bead size.

17. The non-transitory computer readable medium according to claim 16, the image processing includes processing each binary toolpath image into a grayscale image that depicts locations at which bead size should be increased to fill holes not filled by toolpaths with the default bead size, wherein the bead size images are generated based on the grayscale images.

18. The non-transitory computer readable medium according to claim 17, wherein the image processing includes:

processing each binary toolpath image to produce a boundary image depicting an outer boundary of each layer;

processing each binary toolpath image to produce a distance transform image having pixels with values that represent distance to the nearest nozzle head location;

processing each distance transform image to produce a local maxima contour image that depicts boundaries where extruded material from the nozzle is expected to flow and fill a region of a layer;

unifying the boundary images and the local maxima contour images to form a contour image; and blurring the contour image to form the grayscale image.

19. The non-transitory computer readable medium according to claim 18, wherein blurring the contour image is based on a Gaussian kernel with standard deviation corresponding to half the default bead size in pixel coordinates, wherein the image processing further includes:

inverting and normalizing the grayscale image;

setting pixel values for pixels that do not correspond to the toolpaths to zero; and producing the bead size images by rescaling non-zero values of the pixel values to correspond to bead size radii in pixel coordinates at the locations of the toolpaths.

20. The non-transitory computer readable medium according to claim 15, wherein the process parameters are selected to control bead size along the toolpaths based on the pixel values of the bead size images, such that for a given point along the toolpaths, the nearest nonzero pixel is used to control bead size at that point, wherein the process parameters include laser power, nozzle speed, or any combination thereof.

* * * * *